United States Patent Office 3,427,207
Patented Feb. 11, 1969

3,427,207
BATTERIES WITH HALOGEN FLUORIDE ELECTROLYTE
Madeline S. Toy, Fountain Valley, William A. Cannon, Costa Mesa, William David English, Orange, and Carl Berger, Santa Ana, Calif., assignors, by mesne assignments, to the United States of America as represented by the Secretary of the Army
Filed Oct. 28, 1966, Ser. No. 591,059
U.S. Cl. 136—155     10 Claims
Int. Cl. H01m 11/00

ABSTRACT OF THE DISCLOSURE

Non-aqueous, non-protonic electrolytes comprising halogen fluorides, or halogen fluorides in combination with covalent fluorides for use in electrochemical cells or batteries. The electrolyte containing electrochemical cells or batteries operates efficiently at low temperatures.

---

Figure 1:
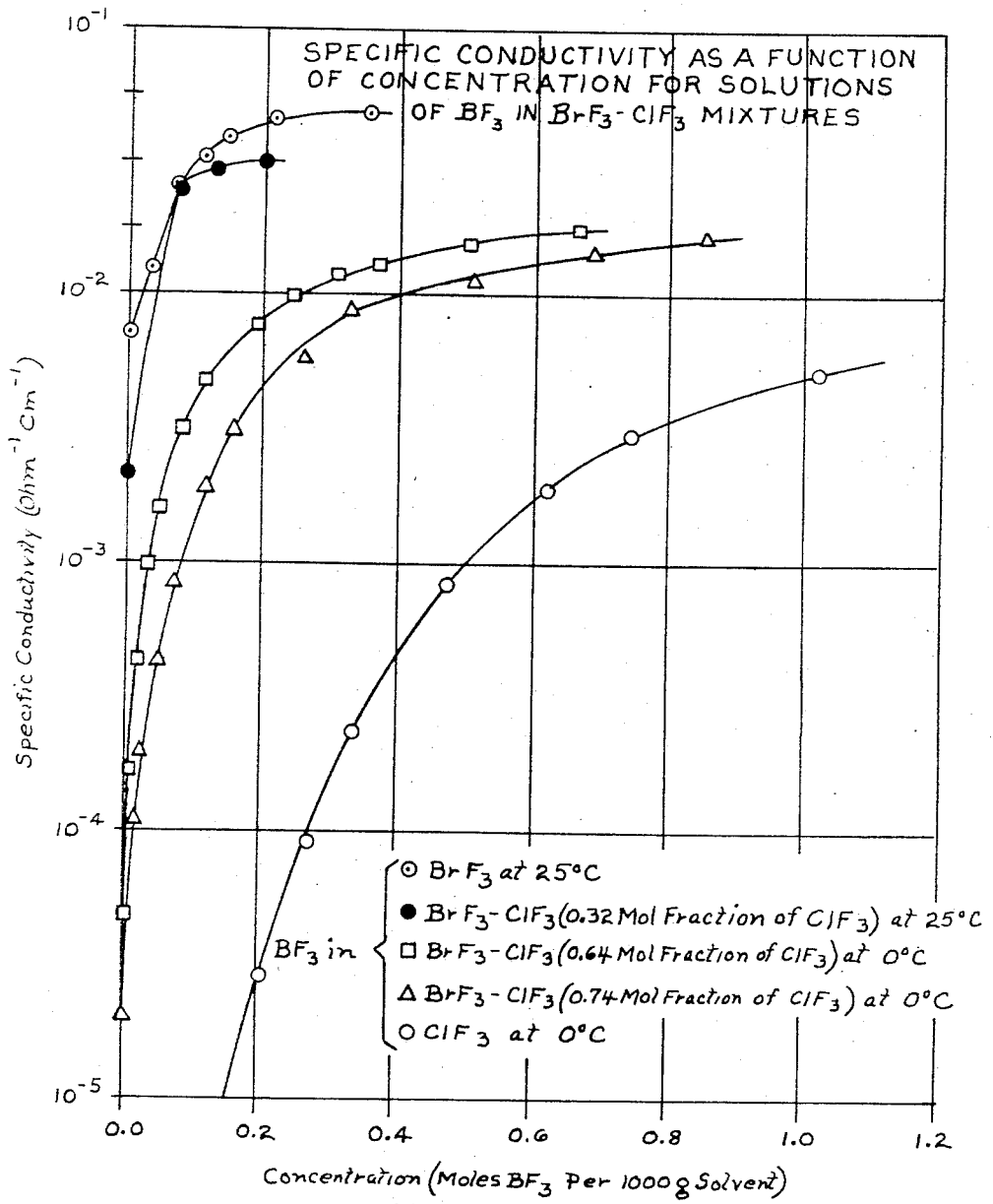

The invention described herein may be manufactured and used by or for the Government, for governmental purposes, without the payment to us of any royalty thereon.

This invention relates to electrochemical cells and batteries for producing electrical power at low temperatures. More particularly, the invention pertains to novel non-aqueous, non-protonic electrolytes that remain highly conductive and at a low viscosity at low freezing temperatures.

The problems evolved in producing portable sources of electrical power for low temperature operation have not been solved. Most portable sources of power—wet cell batteries, dry cell batteries, fuel cells, etc.—do not function effectively at temperatures below —30° F. For arctic service electrochemical cells are now required that can function efficiently at temperatures as low as —60° F.

Previous difficulties with low temperature operation of cells and batteries were due generally to the nature of the electrolyte. Almost any aqueous salt solution will freeze eventually at some low temperature. Certain organic fluids were more effective for lowering the freezing temperature of aqueous electrolytes; however, these fluids were decreasing the electrical efficiency of the solutions. Lower temperatures account for increase viscosity of solutions and thus decrease the effective transport rates for ions.

Other problems also become apparent when cells or batteries are operated at freezing temperatures: Chemical activity, for example, is greatly affected by a drop in temperature; reaction rates are halved by a twenty-degree drop in temperature. Also, chemical equilibria are affected by temperature changes, so that the total power available from a cell is often severely reduced. Internal resistance of a cell is markedly increased as the operating temperature of the cell is decreased.

It is therefore an object of the present invention to provide novel electrolytes for devices that produce electrical power by chemical reactions at temperatures where most electrochemical devices do not function effectively.

Another object of the invention is to provide improved cells and batteries that incorporate therein non-aqueous electrolytes and suitable electrodes for the production of useful power.

A further obpect of the invention resides in the novel chemical reactions of the present electrolytes whereby more electrochemical energy can be obtained per equivalent of reacting substances because of the higher free energy change accompanying such reactions.

A still further object is to provide mixtures of self-ionizing and non-ionizing substances that function more effectively as electrolytes for extreme subzero climates.

In accordance with the invention, interhalogens are now provided either signly or in mixtures as the main reacting components of novel electrolyte systems for cells and batteries. The present interhalogens which possess desirable electrolyte properties comprise various halogen fluorides, such as, chlorine trifluoride, bromine trifluoride, bromine pentafluoride, iodine pentafluoride, iodine heptafluoride, etc. These fluorides, which are liquids at low temperatures, are particularly desirable from the standpoint of electrochemical cell applications because they possess self-ionizing properties that are non-protonic in nature. For example, ions produced by the self-ionization of $ClF_3$ and of $BrF_3$ may be illustrated as follows:

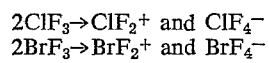

$$2ClF_3 \rightarrow ClF_2^+ \text{ and } ClF_4^-$$
$$2BrF_3 \rightarrow BrF_2^+ \text{ and } BrF_4^-$$

Halogen fluorides also possess a wide liquid range as well as desirable solvent properties that are the basis of further improvements in the present electrolyte solutions, as disclosed below. The liquid range of $ClF_3$ extends from —83° C. (melting point) to 11° C. (boiling point); the liquid range of $BrF_3$ extends from 8° C. (melting point) to 127° C. (boiling point).

We have now found that certain covalent fluorides, such as, boron trifluoride, $BF_3$, or hydrogen fluoride, HF, which are not self-ionizing, may be dissolved in interhalogen liquids to produce solutions which are highly conductive and of low viscosities at low temperatures. The conductivity of the resulting solutions is raised to levels comparable with that of dilute aqueous salt solutions. Other fluorides which may also be used to improve the performance of the present electrolytes are titanium tetrafluoride and beryllium difluoride.

In one aspect of our invention is particularly directed to preferred mixtures comprising specific halogen fluorides and including a soluble fluoride which is not self-ionizing but which undergoes ionization in the presence of halogen fluordes.

The chemical activity of fluorinating agents is considerably greater than that of aqueous solutions in which the electrolytic action is based on oxidizing agents. More electrochemical energy may be obtained by the present electrolytes per equivalent of reacting substances because fluorination reactions undergo a higher free energy change as compared with the usual oxidation reactions of previous cells.

In view of the greater chemical activity of the present fluorinating agents, the electrode materials which are immersed therein must be selected with extreme caution, for many potentially useful electrode materials react with violence and even explode in their presence. The following metals and their alloys may be safely used as electrodes in combination with fluoride electrolytes: platinum, aluminum, nickel, silver, copper, iron, cadmium, lead and zinc.

Figure 2:
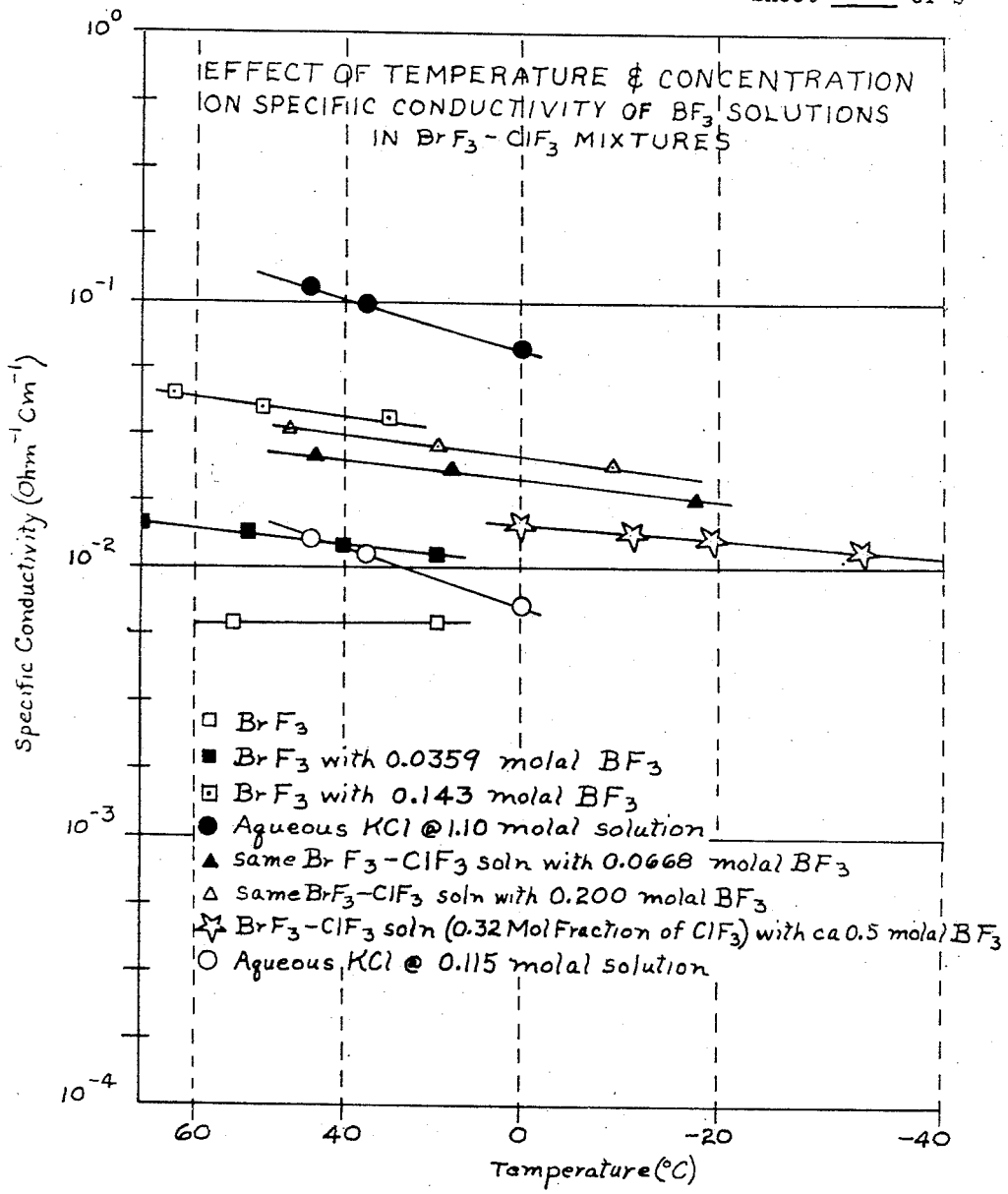

The electrolytes of this invention may be exemplified by the following detailed description taken in connection with the accompanying drawings in which:

FIGURE 1 is a graphic representation showing the specific conductivity of solutions of $BF_3$ in halogen fluoride mixtures, and FIGURE 2 is a graphic representation of the effect of temperature and concentration on the specific conductivity of $BF_3$ dissolved in bromide trifluoride-chlorine trifluoride mixtures.

An electrochemical cell capable of producing useful power is formed by immersing a pair of suitable electrodes in a quantity of bromide trifluoride. The cell comprises an insulated container and a pair of electrodes supported therein and in close juxtaposition to each other in the conventional arrangement as taught in the art. One electrode (cathode) comprises a sheet of platinum, and the other electrode (anode) comprises a sheet of cadmium. Each of said electrodes is connected to separate external terminals for the cathode and the anode. When the terminals are connected through an external load, currents in the order of 100 ma./cm.$^2$ of anode area can be withdrawn from the cell.

The following electrode reactions are believed to be involved in the operation of the cell:

Anode reaction: $Cd \rightarrow Cd^{++} + 2$ electrons
$$Cd^{++} + 2F^- \rightarrow CdF_2\downarrow$$

Cathode reaction:
$$BrF_3 + 2 \text{ electrons} \rightarrow BrF + 2F^-$$

Overall cell reaction:
$$Cd + BrF_3 \rightarrow CdF_2\downarrow + BrF$$

The observed open circuit potential of the above cell is 2.25 volts at 25° C.

Turning now to FIGURES 1 and 2 of the drawings, the data presented therein are directed to the electrolyte system of chlorine trifluoride-bromine trifluoride-boron trifluoride and to the specific conductivities, e.g., in the ranges of $10^{-5}$ to about $10^{-1}$ ohm$^{-1}$ centimeter$^{-1}$, and $10^{-4}$ to about $10^0$ ohm$^{-1}$ centimeter$^{-1}$, attained by said fluoride mixture. It has been observed that halogen fluorides and other fluorinating agents may be utilized in a wide range of mixtures to form improved conductive solutions in the temperature range of −60° F. to 50° F. FIGURE 1 illustrates the conductivity of various concentrations of $BF_3$ in halogen fluorides and mixtures of said fluorides, e.g., in the range of up to 1.2 moles of boron trifluoride per 1000 grams of solvent. The conductivity is increased as the concentration of $BF_3$ increases in the fluoride solution.

FIGURE 2 indicates graphically the effect of temperature on the conductivity of fluoride electrolytes. The specific conductivity of 0.115 molal and 1.10 molal solutions of KCl in water are included for comparative purposes. It can be seen from the graphs that the temperature coefficients of resistance are much smaller for the halogen fluorides than for the aqueous systems. At −60° F. the conductivity of chlorine trifluoride-bromine trifluoride-boron trifluoride is approximately the same as that of a 0.1 N KCl at room temperature.

It will be realized that the foregoing example and the graphical data presented are not intended to limit the scope of the fluoride electrolytes nor the spirit of the invention as it pertains to novel cells and batteries, but rather to illustrate some of the electrolyte properties which are possible according to the teachings of the present invention. It is apparent that various modifications and changes may be made in these electrolytes without departing from the scope of the invention as disclosed herein. Accordingly, it is the intent of this invention to claim all such modifications and changes as are within the scope of the appended claims.

What is claimed is:

1. A battery having a non-aqueous, non-protonic electrolyte therein, said electrolyte comprising a solution containing at least one halogen fluoride selected from the group consisting of chlorine trifluoride, bromine trifluoride, bromine pentafluoride, iodine pentafluoride and iodine heptafluoride.

2. A battery as in claim 1 in which said fluoride is bromine trifluoride.

3. A battery as in claim 1 in which said fluoride is chlorine trifluoride.

4. A battery as in claim 1 in which said solution is a mixture consisting essentially of chlorine trifluoride and bromine trifluoride.

5. A battery as in claim 4 which includes a covalent fluoride dissolved in said mixture in an amount sufficient to improve the conductivity of said electrolyte.

6. A battery as in claim 5 which consists essentially of boron trifluoride dissolved in a solution of bromine trifluoride and chlorine trifluoride in an amount sufficient to raise the specific conductivity to a value in the range of about $10^{-4}$ to about $10^{-1}$ ohm$^{-1}$ centimeter$^{-1}$.

7. A battery as in claim 6 in which said boron trifluoride is present in a concentration of about 0.01 to about 1 molal.

8. A battery as in claim 5 wherein said covalent is selected from the group consisting of
boron trifluoride
hydrogen fluoride
beryllium difluoride
titanium tetrafluoride 9. A battery as in claim 6 wherein chlorine trifluoride is included in about 0.8 mol fraction.

10. A battery having a non-aqueous, non-protonic electrolyte and covalent fluoride therein, said electrolyte comprising a solution containing at least one halogen fluoride selected from the group consisting of chlorine trifluoride, bromine trifluoride, bromine pentafluoride, iodine pentafluoride and iodine heptafluoride, said covalent fluoride consisting of boron trifluoride dissolved in the solution to form from about 0.01 to about 0.5 molal solution.

References Cited

UNITED STATES PATENTS

| | | | |
|---|---|---|---|
| 3,236,694 | 2/1966 | Stenger et al. | 136—155 |
| 3,368,926 | 2/1968 | Toy | 136—155 |

WINSTON A. DOUGLAS, *Primary Examiner.*

D. L. WALTON, *Assistant Examiner.*